D. M. HURLBURT.
PHOTOGRAPHIC EXPOSURE MECHANISM.
APPLICATION FILED OCT. 20, 1917.
1,298,723.
Patented Apr. 1, 1919.
3 SHEETS—SHEET 1.
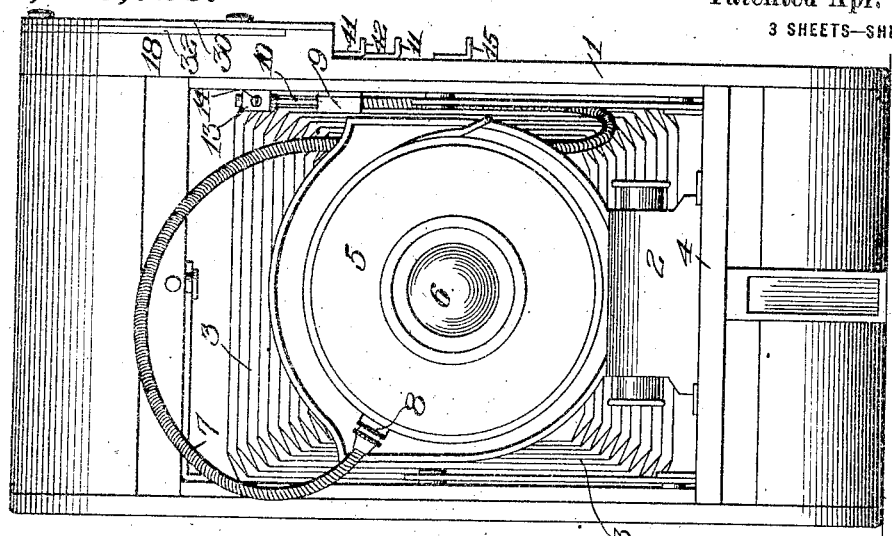
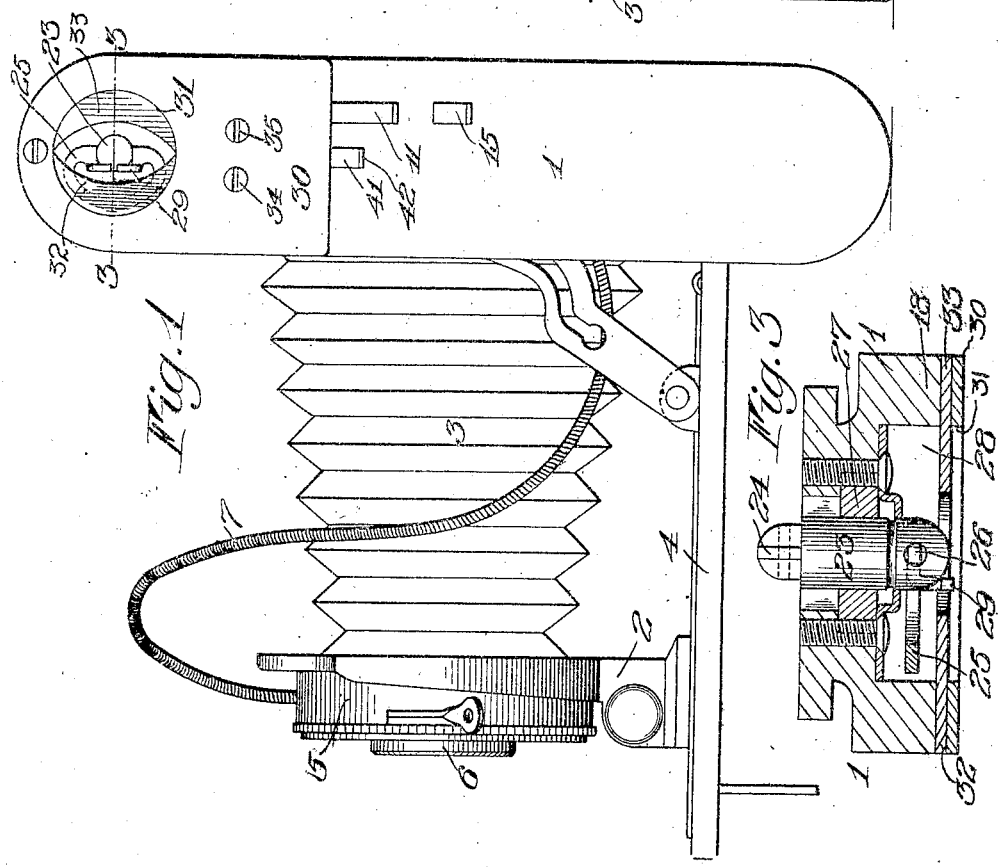
WITNESSES:
INVENTOR.
David M. Hurlburt
BY
his ATTORNEYS.

D. M. HURLBURT.
PHOTOGRAPHIC EXPOSURE MECHANISM.
APPLICATION FILED OCT. 20, 1917.
1,298,723.
Patented Apr. 1, 1919.
3 SHEETS—SHEET 2.
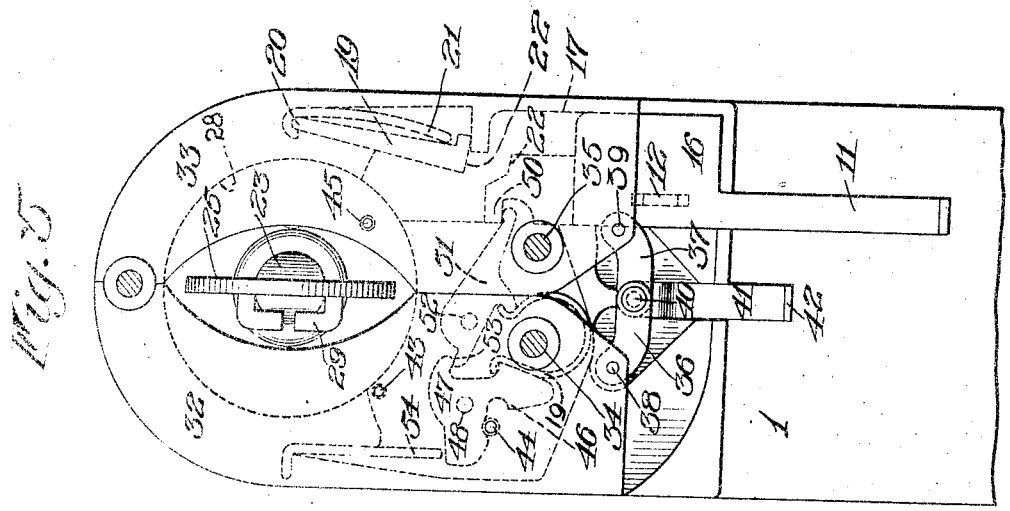
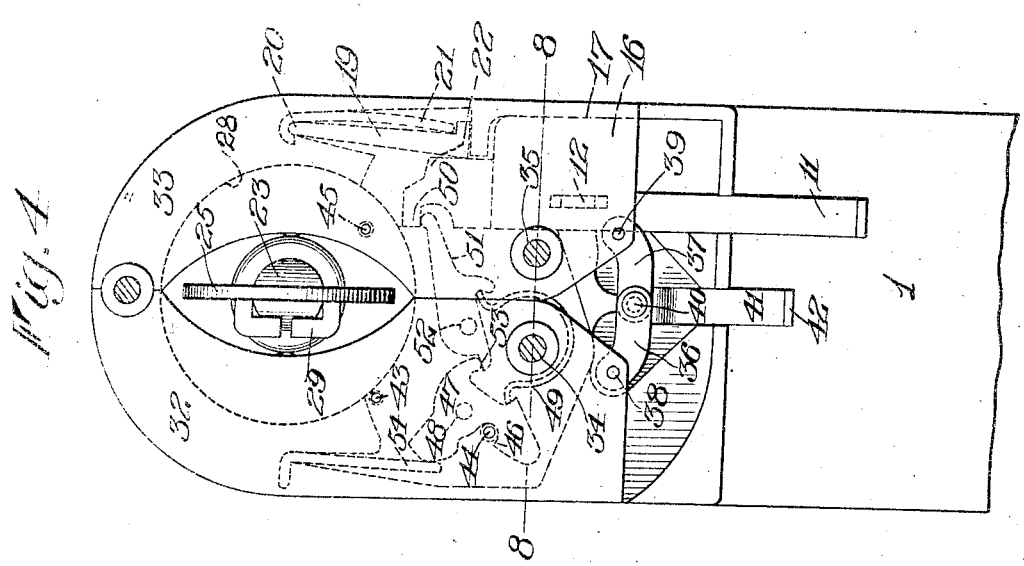
WITNESSES:
INVENTOR.
David M. Hurlburt
BY
his ATTORNEYS.

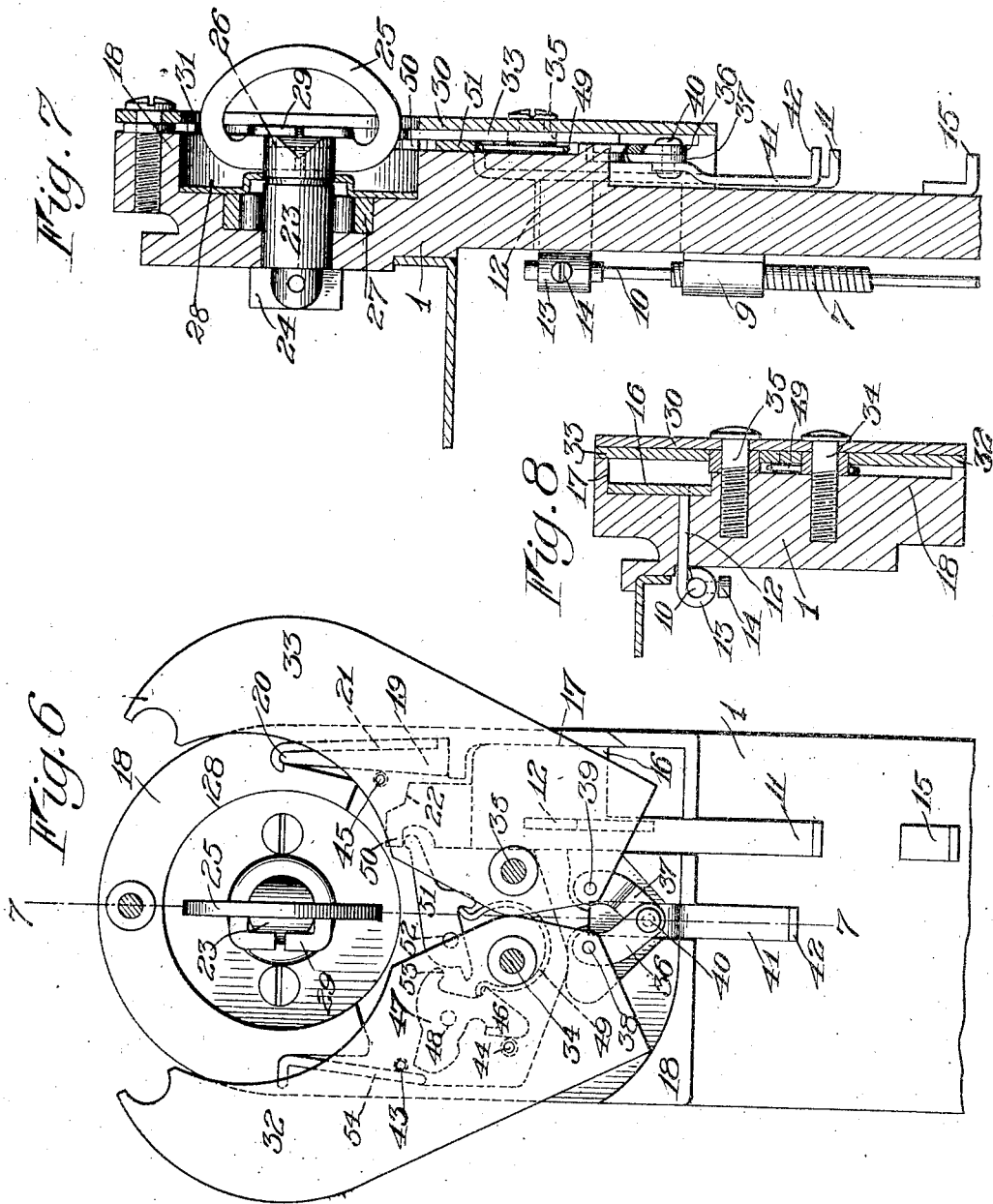

UNITED STATES PATENT OFFICE.

DAVID M. HURLBURT, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC EXPOSURE MECHANISM.

1,298,723.

Specification of Letters Patent.

Patented Apr. 1, 1919.

Application filed October 20, 1917. Serial No. 197,532.

*To all whom it may concern:*

Be it known that I, DAVID M. HURLBURT, of Rochester, in the county of Monroe and State of New York, have invented certain new and useful Improvements in Photographic Exposure Mechanism; and I do hereby declare the following to be a full, clear, and exact description of the same, reference being had to the accompanying drawings, forming a part of this specification, and to the reference-numerals marked thereon.

My present invention relates to photography and more particularly to photographic film cameras and it has for its object to provide a simple and efficient exposure mechanism placing the film winding device and the shutter operating device each under the control of the other to the end that two exposures of the same film area may not be made nor a portion of the film wound out of the field of exposure without being exposed. To these and other ends the invention resides in certain improvements and combinations of parts all as will be hereinafter more fully explained, the novel features being pointed out in the claims at the end of the specification.

In the drawings:

Figure 1 is a side elevation of a folding film camera constructed in accordance with and illustrating one embodiment of my invention;

Fig. 2 is a front elevation thereof;

Fig. 3 is an enlarged detail section through the winding mechanism taken substantially on the line 3—3 of Fig. 1;

Fig. 4 is an enlarged fragmentary view showing the controlling mechanism in normal position;

Fig. 5 is a similar view showing the positions of the parts of the mechanism after the shutter has been operated;

Fig. 6 is a similar view showing the positions of the parts while the film is being wound;

Fig. 7 is a section on the line 7—7 of Fig. 6, and

Fig. 8 is a section taken substantially on the line 8—8 of Fig. 4.

Similar reference numerals throughout the several views indicate the same parts.

My improvements are applicable to any type of camera but in the present instance I have shown them applied to a folding pocket film camera of a familiar type comprising a body 1 and a front 2 connected by a bellows 3, the front being movable on a folding bed 4 and carrying a shutter 5 the lens of which is indicated at 6 in Fig. 2. The shutter is operated by a cable release device of a familiar type embodying a flexible tubular casing 7 having a connection 8 at one end with the shutter casing 5 and held at the other end by a clip or bracket 9 on the inside of a wall of the body 1, as shown in Figs. 2 and 7. Within the casing operates a sliding cable or thrust member 10 which is also flexible and the outer end of which (not shown) enters the shutter casing 5 to press against and operate a shutter tripping or actuating part. The thrust movement is communicated to the cable by a sliding finger-piece 11 arranged on the exterior of the body 1 and having an arm 12 extending through a wall of the latter to terminate in an eye 13 in which the end of the cable is secured in the present instance by a set screw 14. The finger-piece 11 is pressed downwardly to communicate the thrust to the cable 10 and operate the shutter and below it is arranged a fixed finger-piece 15 to give a purchase for the fingers in pressing down the finger-piece 11.

The latter has a sliding body portion 16 that operates in a guideway 17 provided in a mounting plate 18 secured to the exterior of the camera body. When the shutter is operated a latch 19 pivoted at 20 and impelled by a leaf spring 21 automatically engages with a shoulder 22 on the body 16 and holds the finger-piece 11 depressed. Hence the cable 10 is held projected and until it returns, the shutter parts also cannot return and the shutter cannot again be operated until the latch 19 is released.

The film winding device may consist of the ordinary winding key 23 shown in section in Fig. 3. On its inner end it has a cross-piece 24 for coöperation with the slotted end of the film spool and at its outer end it has a wing or thumb piece 25 journaled in the key stem at 26 to move between the folded position of Fig. 3 or Fig. 1 and the extended position of Figs. 6 and 7. The usual clutch block 27 prevents back wind and the key is so mounted on the camera body that the wing 25 when folded occupies a well or recess 28 in said camera wall. An ear 29 on the wing 25 furnishes a finger hold for rotating it upwardly or outwardly into its operative position from the folded position.

Above the mounting plate 18 is a cover plate 30 having an opening 31 therein coincident with the well 28. This cover plate is removed in the showing of Figs. 4, 5 and 6. Between it and the mounting plate operate two pivoted leaves 32 and 33 which when closed, as in Figs. 1, 3 and 4, render the winding key inaccessible to the operator or prevent it from being rotated. These leaves or guards are pivoted at 34 and 35, respectively, and are connected for joint movement by links 36 and 37 pivoted to them at 38 and 39 and to each other at 40 where they are joined to a slide 41 terminating in a finger-piece 42 that may be lowered to close the guards and lifted to open them.
The guard 32 is provided with two inwardly projecting pins 43 and 44 and the guard 33 with one similar pin 45. The winding operation is conducted while the guards are spread or inoperative as in Fig.
6. When they are closed they are locked in that operative position by pin 44 on guard 32 becoming engaged by a shoulder 46 on a latch member 47 pivoted at 48 and turned to the right by a spring 49, as shown in Fig. 4. They remain locked until the shutter is operated and the body plate 16 of finger-piece 11 is drawn down. A shoulder 50 thereon thereupon depresses a lever 51 pivoted at 52 and engaging the lock member 47 at 53. This rocks the lock 47 to the position of Fig. 5 releasing the pin 44, and the lock 47 is held in this position by a spring latch finger 54 which prevents spring 49 from returning it. It will be here noticed that spring 49 also operates lever 51 and through it seeks to return the finger-piece slide 16 of the shutter operating member. But latch 19 has meantime gone into the path of shoulder 22 on the finger-piece slide and it cannot return for another actuation of the shutter. The pin 44 being released as described, the guards 32 and 33 may now be opened as in Fig. 6 to render the winding key 23 accessible for turning whereupon pin 43 on the guard leaf 32 displaces spring latch 54 as shown in said figure, freeing lock 47 for effective operation. At the same time, pin 45 on guard 33 releases latch 19 from the shoulder 22 of the shutter slide 16 and the latter returns ready for another operation of the shutter as also appears in Fig. 6. The closing of the guard blades again restores the positions of Fig. 4 and the shutter may be again operated to expose the fresh length of film that has been drawn into the field of exposure.

Fig. 4 shows the film wound, the key locked against further winding and the shutter operating member free for actuation. Fig. 5 shows the shutter device operated and locked with the guards released, and Fig. 6 shows the shutter operating member released and the guards ready to be automatically locked as soon as they are closed to their operative positions. Thus, it will be seen that a movement of the guards to wind the film must intervene between successive operations of the shutter and an operation of the shutter must intervene between successive displacements and replacements of the guard in winding the film. Therefore, the film, once the guards are closed, cannot be wound off until exposed and the same film cannot be exposed twice without actuating the guards.

I claim as my invention:

1. In a camera, the combination with a film winding device, a shutter and a shutter operating device, of means under the control of one of said devices for rendering the other inaccessible to the operator.

2. In a camera, the combination with a film winding key, a shutter and a shutter operating device, of means under the control of the latter for rendering the film winding key inaccessible to the operator.

3. In a camera, the combination with a film winding device, a shutter and shutter operating device, of means under the control of one of said devices for rendering the other inaccessible to the operator, and a lock for the controlling device controlled by said means.

4. In a camera, the combination with a film winding device, a shutter and a shutter operating device, of a guard for rendering the film winding device inaccessible to the operator, means released by the shutter actuating device for locking the guard in operative position and means released by the movement of the guard to inoperative position for locking the shutter operating member.

5. In a camera, the combination with a film winding device, a shutter and a shutter operating device, of a pair of guards for rendering one of said devices inaccessible to the operator and connected for joint movement, a lock for one of the guards released by the other device, and a lock for the latter released by the other guard.

6. In a camera, the combination with a film winding device, a shutter and a shutter operating device, of a pair of guards for rendering one of said devices inaccessible to the operator and connected for joint movement, a lock for one of the guards, released by the other device, for automatically holding it when said guard is moved to operative position, and a lock for the releasing device, released by the other guard, for automatically holding said device against return after it is operated.

7. In a camera, the combination with a camera body having a well therein, a film winding key in the well, a shutter and a shutter operating device, of a pair of guards for closing the well and connected for joint movement, a spring lock for one of the guards released by the shutter operating device for automatically holding said guard in closed position, a spring lock for the shutter operating device released by the opening of the other guard for automatically holding said device against return after it is operated, and means for resetting the guard lock when the shutter operating device is actuated.

8. In a camera, the combination with a folding film winding key and a shutter operating device, of means under the control of the latter for maintaining the winding key folded.

9. In a camera, the combination with a folding film winding key and a shutter operating device, of means under the control of the latter for maintaining the winding key folded, and a lock for the shutter operating device controlled by said means.

DAVID M. HURLBURT.

Witnesses:
HELEN M. FRASER,
MARGARET DINGNAN.